UNITED STATES PATENT OFFICE.

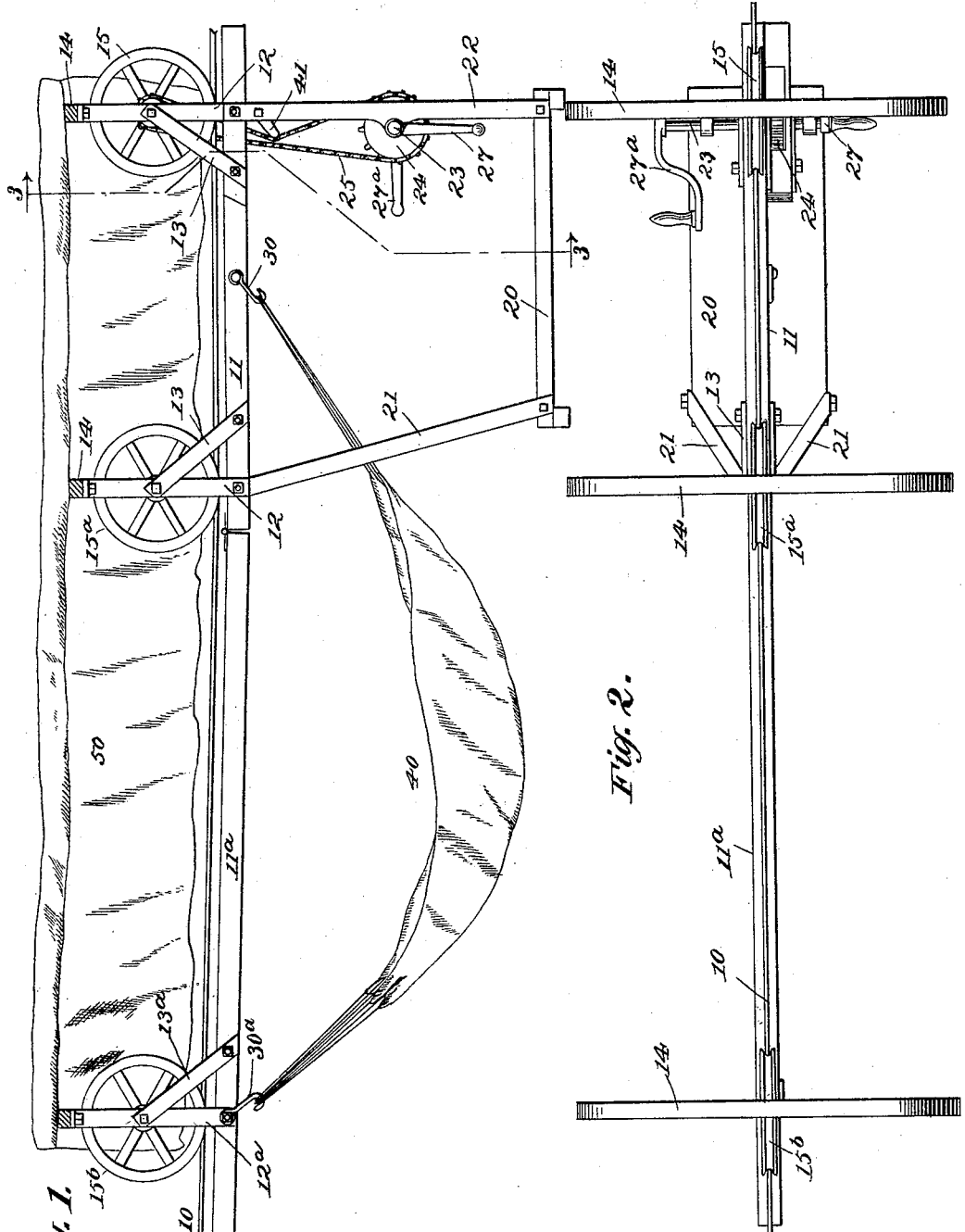

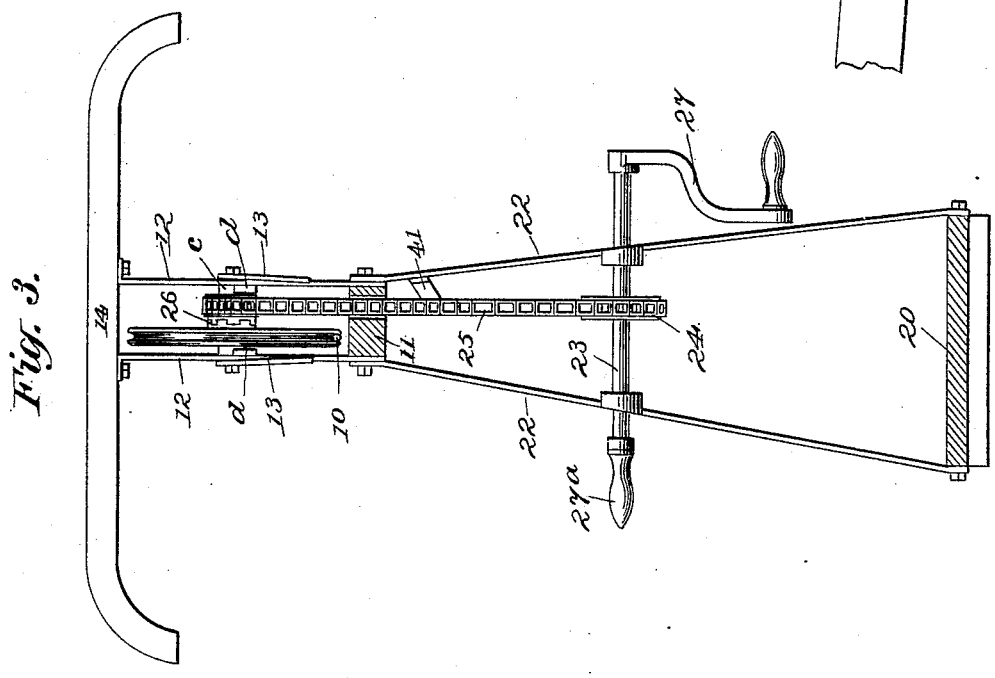

JOSEPH J. JOHNSON, OF DAYTON, OHIO, ASSIGNOR TO McINTIRE, SLAGHT & JOHNSON.

HAMMOCK AND SEAT SUPPORT.

SPECIFICATION forming part of Letters Patent No. 410,796, dated September 10, 1889.

Application filed May 1, 1889. Serial No. 309,166. (No model.)

*To all whom it may concern:*

Be it known that I, JOSEPH J. JOHNSON, of Dayton, in the county of Montgomery and State of Ohio, have invented a new and Improved Hammock and Seat Support, of which the following is a full, clear, and exact description.

This invention relates to hammock-supports, the object of the invention being to provide a support which may be readily moved from place to place on a certain predetermined line; and to the end named the invention consists, essentially, of a supporting wire or cable, a frame carrying wheels which ride upon the cable, said frame being provided with hammock-supporting hooks and with a seat, and a means, substantially as will be hereinafter explained, for driving one of the wheels.

Reference is to be had to the accompanying drawings, forming a part of this specification, in which similar figures and letters of reference indicate corresponding parts in all the views.

Figure 1 is a side view of my improved hammock-support, parts being shown in section. Fig. 2 is a plan view thereof, the awning being removed. Fig. 3 is a cross-sectional view on line 3 3 of Fig. 1. Fig. 4 is a sectional detail view of the supporting-wheel, which is driven by the driving mechanism; and Fig. 5 is a detail view illustrating the connection between the sectional bars.

In the drawings, 10 represents a supporting wire or cable, which is secured at its ends to any convenient support, and which in practice would be provided with a wire-tightening attachment of any desired form. The cable or wire 10 serves as the support for a bar 11, which carries vertical standards 12, that are supported by braces 13, and which support cross-bars 14. The bars 12 are arranged in pairs, and in each pair there are journaled, respectively, wheels 15 and $15^a$, said wheels being formed with grooved peripheral faces, in order that they may readily ride upon the supporting wire or cable 10. A seat 20 is suspended beneath the bar 11 by means of bars 21 and 22, and between the bars 22 there is journaled a shaft 23, which carries a sprocket or chain wheel 24, upon which there is arranged a chain 25, running in engagement with a chain or sprocket wheel 26, carried by one of the trunnions of the wheel 15, such chain or sprocket wheel 26 constituting one half of a clutch-section, the other half of the clutch-section being formed upon the hub of the wheel 15. The shaft 23 is provided with two crank arms or handles 27 and $27^a$.

To one end of the bar 11 is hinged a bar $11^a$, which carries standards $12^a$, that are braced by braces $13^a$, and between the standards $12^a$ is mounted a wheel $15^b$. To the bars 11 and $11^a$ are secured hooks 30 and $30^a$, which serve as supports for a hammock 40. The wheels 15, $15^a$, and $15^b$ may be supported in any proper manner; but in practice I prefer to form such wheels with heavy trunnions $c$, which rest upon bearings $d$, carried by the standards 12 and $12^a$, the trunnions being apertured to receive pivot-bolts $e$. This arrangement I prefer, inasmuch as it relieves the pivot-bolts of all undue strain.

In operation the frame above described is adjusted as represented in Figs. 1, 2, and 3, the cross-bars 14 serving as a support for an awning 50. Then by turning the shaft 23 the hammock-supporting frame may be moved forward or back upon its supporting wire or cable 10. The object of uniting the bars 11 and $11^a$ by a hinge-joint is to provide for the necessary sagging of the supporting wire or cable, and consequently I prefer to form the main supporting-bar in sections, as described. Although not positively essential, I prefer to arrange a belt-tightener 41 in connection with the belt or chain 25.

Having thus described my invention, I claim as new and desire to secure by Letters Patent—

1. The combination, with a sectional supporting-bar, of wheels arranged above the bar and hooks carried by the bar-sections, substantially as described.

2. In a hammock-support, the combination, with a sectional bar, of wheels journaled above the bar, cross-bars extending over the wheels, hooks carried by the bar-sections, a platform suspended beneath the bar, and a means, substantially as described, for driving one of the wheels, as and for the purpose stated.

JOSEPH J. JOHNSON.

Witnesses:
GEORGE B. EWALD,
THOS. McDONALD.